(No Model.)

W. H. REEVES.
DRAFT EQUALIZER.

No. 430,753. Patented June 24, 1890.

Witnesses:
J. P. Theo Lang.
E. T. Fenwick

Inventor
William H. Reeves
by his atty.
Mason, Fenwick & Lawrence

UNITED STATES PATENT OFFICE.

WILLIAM H. REEVES, OF MAURICE, IOWA.

DRAFT-EQUALIZER.

SPECIFICATION forming part of Letters Patent No. 430,753, dated June 24, 1890.

Application filed February 11, 1890. Serial No. 339,984. (No model.)

*To all whom it may concern:*

Be it known that I, WILLIAM H. REEVES, a citizen of the United States, residing at Maurice, in the county of Sioux and State of Iowa, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers; and it consists in certain new combinations and arrangements of parts, as will be hereinafter described and specifically claimed, whereby a very simple and convenient construction is secured by which three horses may be hitched on one side of the pole and one on the other, and at the same time all side draft is overcome and the pole team allowed to pull straight and not diagonally across the tongue, as in other heretofore-patented equalizers.

Figure 1:
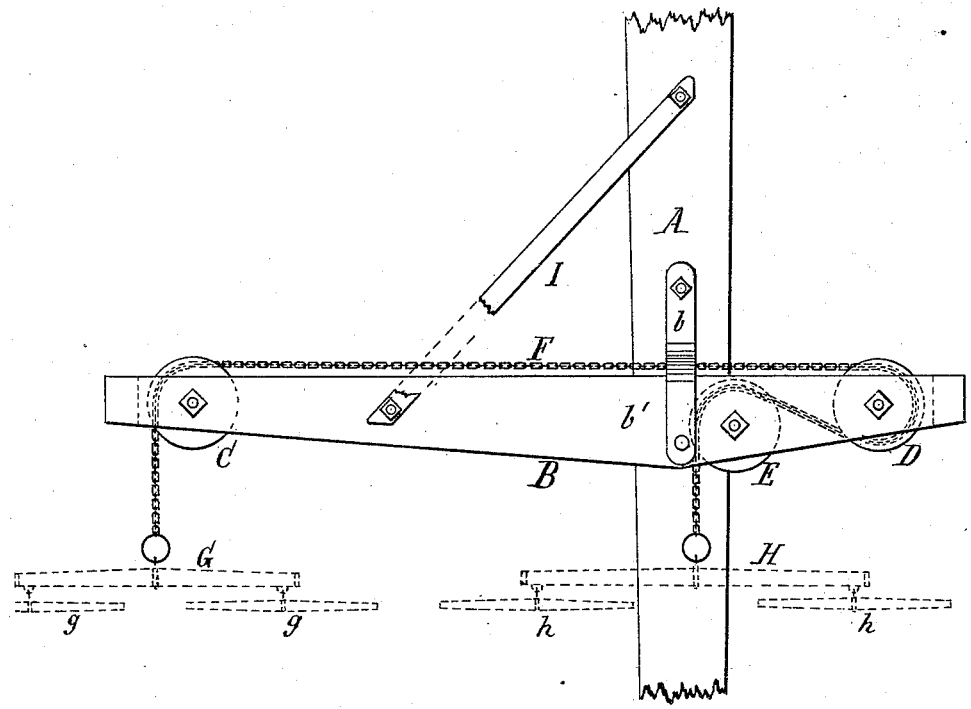
Figure 2:
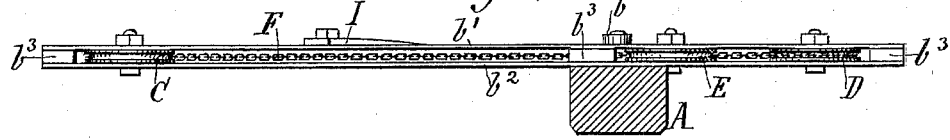

In the accompanying drawings, Figure 1 is a top view of the equalizer, showing the parts as when in use; and Fig. 2 is a front elevation of the draft-bar, showing clearly the arrangement and construction of the pulleys and chains.

A in the drawings represents a tongue or pole, and B a draft-bar or evener arranged at right angles to the pole, and rigidly secured to the same by means of the hammer-strap and bolt $b$, as shown, or in any other suitable manner, the draft-bar extending about two-thirds on one side and one-third on the other side of the tongue A.

The draft-bar or evener B may be made of wood, or wood and metal combined, and is constructed in two pieces $b'$ $b^2$, as shown in Fig. 2, and held apart by pillar-blocks $b^3$, placed at intervals along the draft-bar and united by fastenings passed down through them and the blocks. Between the plates or bars $b'$ $b^2$ of the draft-bar are placed three ordinary pulleys C, D, and E, arranged, respectively, at the long and short ends of the draft-bar and at or near the pole, all of the pulleys being arranged in about the same transverse line on the bar B. Around the pulleys is arranged the rope or chain F, one end of which is fastened to the doubletree G, having singletrees $g$ $g$, and from thence it is carried back around pulley C, passed over and around pulley D, thence to pulley E, and secured by its other end to doubletree H, having singletrees $h$ $h$.

I is a brace-rod, preferably of iron, secured by bolts and nuts or otherwise suitably to the draft-bar and running rearwardly and diagonally to the pole, and there firmly secured, this brace-rod, together with the hammer-strap and bolt $b$, securely holding the draft-bar in place on the tongue and rendering it perfectly rigid.

By having pulley E placed in line with the pole A and in the same transverse line with pulleys C and D, I am enabled to hitch the pole team directly on the tongue, instead of being compelled to hitch the near horse to one side of the pole and out of line of the draft, as in other equalizers of this type, thereby allowing the pole team to pull direct and evenly and not diagonally, thus removing the great strain on the near team.

It will be seen by arranging the three pulleys C, D, and E in a transverse line on the draft-bar B and by placing pulley D at near end of bar B, with chain running around said pulley from pulley C attached at off end of bar, and with the rope or chain of pulley E arranged directly over the pole, that both teams pull against said pulley D, thereby overcoming all side draft and allowing both teams to pull exactly in line with the draft.

By forming the draft-bar of two plates or bars with the pulleys between them the equalizer is rendered much more durable and less liable to get out of order, as it is manifest that the pulleys, when placed on top of the bar, have a tendency to turn the machine over, and also that the draft-bar, when made in two pieces, enables the pulleys to work with less side friction because of the equal bearing both on top and bottom, which prevents the pulleys tilting.

It will be seen from the drawings that pulley E is in direct line with pole A and also in line with pulleys C and D, and by this arrangement I avoid the necessity of placing the point of draft eight to twelve inches on the near side of tongue, thereby overcoming the difficulty of the pole team pulling diagonally across the tongue, as in all other four-horse equalizers, but allowing both teams to pull straight.

From the aforegoing description and accompanying drawings it will be seen that my equalizer does not interfere with any part of the machine to which it is attached, as it requires no more room on the tongue than an ordinary two-horse evener, and that it is used at the same place on the tongue as when two horses are employed, and that it does not interfere with the tilting-lever of a harvester. In short, a very simple, effective, and compact equalizer is produced.

What I claim as my invention is—

1. In a draft-equalizer, in combination, the pole A, draft-bar B, set at right angles to the pole and extending about two-thirds on one side and one-third on the other side of said pole, the chain or rope F, the pulleys C, D, and E, secured on the bar B and practically in a transverse line, the chain F being passed in a straight line back of the two pulleys B C, then around said pulleys, then diagonally and back of and partly around pulley E, the hammer-strap and bolt $b$, and brace-rod I, all arranged substantially as described.

2. In a draft-equalizer, in combination, the pole A, draft-bar B, said bar being composed of two plates or bars $b'$ $b^2$, held apart and suitably secured at their ends and at intervals between said ends by pillar-blocks and suitable fastenings, said bar being set at right angles to the pole and about two-thirds on one side and one-third on the other side thereof, pulleys C, D, and E placed between the plates or bars, rope or chain F, hammer-strap and bolt $b$, and brace-rod I, substantially as described.

3. The draft-equalizer having all of its pulleys on practically the same transverse line, and a chain or rope attached by one of its ends to a doubletree on one side of the tongue and by its other end to a doubletree on the other side of the tongue, and its intermediate portion arranged upon the three pulleys, as described and shown, and said pulleys being so arranged that three singletrees are on the off side of the tongue and one singletree on the near side of the same, substantially as described.

In testimony whereof I hereunto affix my signature in presence of two witnesses.

WILLIAM H. REEVES.

Witnesses:
 THOMAS DEALTRY,
 T. W. ELGIE.

Correction in Letters Patent No. 430,753.

It is hereby certified that in Letters Patent No. 430,753, granted June 24, 1890, upon the application of William H. Reeves, of Maurice, Iowa, for an improvement in "Draft-Equalizers," an error appears in the printed specification requiring correction, as follows: In line 23, page 2, the reference letters "B. C." should read *C. D.;* and that the said Letters Patent should be read with this correction therein that the same may conform to the record of the case in the Patent Office.

Signed, countersigned, and sealed this 15th day of July, A. D. 1890.

[SEAL.]

CYRUS BUSSEY,
*Assistant Secretary of the Interior.*

Countersigned:
   C. E. MITCHELL,
      *Commissioner of Patents.*